US012516800B2

(12) United States Patent
Shapiro

(10) Patent No.: US 12,516,800 B2
(45) **Date of Patent: *Jan. 6, 2026**

(54) ROTATABLE RETROFIT TRIM LIGHTING DEVICE

(71) Applicant: Feit Electric Company, Inc., Pico Rivera, CA (US)

(72) Inventor: Jim Shapiro, Pico Rivera, CA (US)

(73) Assignee: Feit Electric Company, Inc., Pico Rivera, CA (US)

(*) Notice: Subject to any disclaimer, the term of this patent is extended or adjusted under 35 U.S.C. 154(b) by 155 days.

This patent is subject to a terminal disclaimer.

(21) Appl. No.: 18/461,007

(22) Filed: Sep. 5, 2023

(65) Prior Publication Data

US 2023/0408073 A1 Dec. 21, 2023

Related U.S. Application Data

(63) Continuation of application No. 17/716,317, filed on Apr. 8, 2022, now Pat. No. 11,781,743, which is a (Continued)

(51) Int. Cl.
*F21V 21/30* (2006.01)
*F21S 8/00* (2006.01)
(Continued)

(52) U.S. Cl.
CPC .............. *F21V 21/30* (2013.01); *F21S 8/024* (2013.01); *F21S 8/026* (2013.01); *F21V 21/044* (2013.01);
(Continued)

(58) Field of Classification Search
CPC ...... F21V 21/03; F21V 21/044; F21V 21/045; F21V 21/046; F21V 21/088; F21S 8/02;
(Continued)

(56) References Cited

U.S. PATENT DOCUMENTS

| | | | |
|---|---|---|---|
| 7,909,487 | B1 | 3/2011 | Venetucci et al. |
| 9,958,120 | B2 | 5/2018 | Liu et al. |

(Continued)

FOREIGN PATENT DOCUMENTS

| | | | |
|---|---|---|---|
| CN | 204648027 | U | 9/2015 |
| CN | 104990008 | A | 10/2015 |
| KR | 10-0810081 | B1 | 3/2008 |

OTHER PUBLICATIONS

U.S. Appl. No. 17/716,317, filed Apr. 8, 2022, U.S. Pat. No. 11,781,743, Issued.

(Continued)

*Primary Examiner* — Colin J Cattanach
(74) *Attorney, Agent, or Firm* — Alston & Bird LLP

(57) ABSTRACT

A retrofit trim lighting device is provided. In example embodiments, the retrofit trim lighting device comprises a bracket comprising an opening; at least one torsion spring secured to the bracket and configured to mount the retrofit trim lighting device within a recessed housing; a retrofit housing comprising at least one light engine; and an engagement element. The engagement element is secured to the retrofit housing through the opening of the bracket such that, when so secured, the retrofit housing and the bracket are rotatable relative to one another.

19 Claims, 16 Drawing Sheets

Related U.S. Application Data continuation of application No. 17/095,441, filed on Nov. 11, 2020, now Pat. No. 11,415,302, which is a continuation of application No. 16/896,768, filed on Jun. 9, 2020, now Pat. No. 10,865,966, which is a continuation of application No. 16/272,551, filed on Feb. 11, 2019, now Pat. No. 10,724,718, which is a continuation of application No. 15/266,401, filed on Sep. 15, 2016, now Pat. No. 10,247,397.

(60) Provisional application No. 62/335,252, filed on May 12, 2016.

(51) Int. Cl.

| | |
|---|---|
| ***F21S 8/02*** | (2006.01) |
| ***F21S 8/04*** | (2006.01) |
| ***F21V 15/01*** | (2006.01) |
| ***F21V 21/03*** | (2006.01) |
| ***F21V 21/04*** | (2006.01) |
| ***F21Y 115/10*** | (2016.01) |

(52) U.S. Cl.

CPC ................. *F21S 8/02* (2013.01); *F21S 8/022* (2013.01); *F21S 8/028* (2013.01); *F21S 8/03* (2013.01); *F21S 8/036* (2013.01); *F21S 8/04* (2013.01); *F21S 8/043* (2013.01); *F21V 15/01* (2013.01); *F21V 21/03* (2013.01); *F21V 21/04* (2013.01); *F21V 21/041* (2013.01); *F21V 21/042* (2013.01); *F21V 21/045* (2013.01); *F21V 21/046* (2013.01); *F21V 21/047* (2013.01); *F21V 21/048* (2013.01); *F21V 21/049* (2013.01); *F21Y 2115/10* (2016.08)

(58) Field of Classification Search

CPC ...... F21S 8/026; F21S 8/03; F21S 8/04; F21S 8/043

See application file for complete search history.

(56) References Cited

U.S. PATENT DOCUMENTS

| | | | | |
|---|---|---|---|---|
| 9,970,636 | B1 | 5/2018 | Winters | |
| 10,041,654 | B1 | 8/2018 | Ernst et al. | |
| 10,132,477 | B1 | 11/2018 | Winters | |
| 10,188,006 | B2 * | 1/2019 | Parres | H05K 5/0204 |
| 10,247,397 | B2 | 4/2019 | Shapiro | |
| 10,724,718 | B2 | 7/2020 | Shapiro | |
| 10,865,966 | B2 | 12/2020 | Shapiro | |
| 11,415,302 | B2 | 8/2022 | Shapiro | |
| 11,781,743 | B2 | 10/2023 | Shapiro | |
| 2012/0182744 | A1 | 7/2012 | Santiago et al. | |
| 2012/0243229 | A1 | 9/2012 | Cheng et al. | |
| 2015/0338071 | A1 | 11/2015 | Feit et al. | |
| 2016/0320007 | A1 | 11/2016 | Araki | |
| 2016/0348860 | A1 | 12/2016 | Bailey | |
| 2017/0159899 | A1 | 6/2017 | Liu et al. | |

OTHER PUBLICATIONS

U.S. Appl. No. 17/095,441, filed Nov. 11, 2020, U.S. Pat. No. 11,415,302, Issued.

U.S. Appl. No. 16/896,768, filed Jun. 9, 2020, U.S. Pat. No. 10,865,966, Issued.

U.S. Appl. No. 16/272,551, filed Feb. 11, 2019, U.S. Pat. No. 10,724,718, Issued.

U.S. Appl. No. 15/266,401, filed Sep. 15, 2016, U.S. Pat. No. 10,247,397, Issued.

* cited by examiner

ROTATABLE RETROFIT TRIM LIGHTING DEVICE

CROSS-REFERENCE TO RELATED APPLICATIONS

This application is a continuation application of and claims priority to and the benefit of U.S. Nonprovisional application Ser. No. 17/716,317, filed Apr. 8, 2022; which application is also a continuation application of and claims priority to and the benefit of U.S. Nonprovisional application Ser. No. 17/095,441, filed Nov. 11, 2020 and now granted as U.S. Pat. No. 11,415,302; which application is also a continuation application of and claims priority to and the benefit of U.S. Nonprovisional application Ser. No. 16/896,768, filed Jun. 9, 2020 and now granted as U.S. Pat. No. 10,865,966; which application is also a continuation application of U.S. Nonprovisional application Ser. No. 16/272,551, filed Feb. 11, 2019 and now granted U.S. Pat. No. 10,724,718; which application is also a continuation application of and claims priority to and the benefit of U.S. Nonprovisional application Ser. No. 15/266,401, filed Sep. 15, 2016 and now granted U.S. Pat. No. 10,247,397; which application further claims priority to and the benefit of U.S. Provisional Application Ser. No. 62/335,252, filed May 12, 2016; the contents of all of which as are hereby incorporated herein in their entirety.

BACKGROUND

In general, recessed lighting allows a lighting device to be mounted within a recessed housing that is recessed within a mounting surface such as a ceiling or wall. A retrofit trim lighting device may be mounted within a recessed housing such that an aesthetic trim is generally flush with the mounting surface. If the trim is generally round, the orientation of the trim with respect to the recessed housing is generally unimportant. However, for various trim shapes (e.g., square, oval, triangular, and/or the like), the orientation of the trim with respect to the recessed housing and/or with respect to the trim of other nearby recessed lighting devices may be important.

Thus, there is a need in the art for improved retrofit trim lighting devices and methods of mounting retrofit trim lighting devices that allow the trim orientation to be easily adjusted.

BRIEF SUMMARY

Example embodiments of the present invention provide a rotatable retrofit trim lighting device. In particular, various embodiments of the present invention provide a retrofit trim lighting device configured to be mounted within a recessed lighting housing by, for example, torsion spring(s). In example embodiments, the orientation of the retrofit trim lighting device may be adjusted and/or rotated with respect to the recessed housing after installment of the retrofit trim lighting device within the recessed housing.

According to an aspect of the present invention, a retrofit trim lighting device is provided. In an example embodiment, the retrofit trim lighting device comprises a bracket comprising an opening; at least one torsion spring secured to the bracket and configured to mount the retrofit trim lighting device within a recessed housing; a retrofit housing comprising at least one light engine; and an engagement element. The engagement element is secured to the retrofit housing through the opening of the bracket such that, when so secured, the retrofit housing and the bracket are rotatable relative to one another.

According to another aspect of the present invention, a retrofit trim lighting device is provided. In an example embodiment, the retrofit trim lighting device comprises a bracket for mounting the retrofit trim lighting device. The bracket comprises an opening and a planar portion. The planar portion defines a bracket plane. The opening defines a rotation axis that passes through the center of the opening and that is normal to the bracket plane. The retrofit trim lighting device may further comprise a retrofit housing comprising at least one light engine; and an engagement element. The engagement element is secured to the retrofit housing through the opening of the bracket such that, when so secured, the retrofit housing and the bracket are rotatable relative to one another, with the rotation being about the rotation axis.

According to yet another aspect of the present invention, a lighting kit for a retrofit trim lighting device is provided. In example embodiments, the lighting kit comprises a retrofit housing comprising at least one light engine and having a frame affixed thereto; a bracket comprising an opening; and an engagement element. The engagement element is configured to secure the retrofit housing to the bracket through the opening of the bracket such that, when so secured, the retrofit housing and the bracket are rotatable to one another. The lighting kit may further comprise one or more fasteners configured to fasten the engagement element to the retrofit housing through the opening of the bracket.

According to one aspect of the present invention, a retrofit trim lighting device is provided. In an example embodiment, the retrofit trim lighting device comprises a retrofit housing. The retrofit housing comprises one or more slots through a surface of the retrofit housing. The retrofit trim lighting device further comprises a trim secured to a first end of the retrofit housing and one or more torsion springs. Each of the one or more torsion springs are secured to the housing with a slide that is slidably secured within one of the one or more slots.

According to another aspect of the present invention, a retrofit trim lighting device configured to be mounted within a recessed housing is provided. In an example embodiment, the retrofit trim lighting device comprises a retrofit housing comprising one or more slots through a surface of the retrofit housing. The retrofit trim lighting device further comprises one or more slides. Each slide is slidably secured within one of the one or more slots and is configured to secure a torsion spring to the retrofit housing. The torsion spring is configured to secure the retrofit lighting device within the recessed housing. When the retrofit trim lighting device is mounted within the recessed housing, sliding the one or more slides along the corresponding slot(s) causes the retrofit housing to rotate with respect to the recessed housing.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figures 11A, 11B:
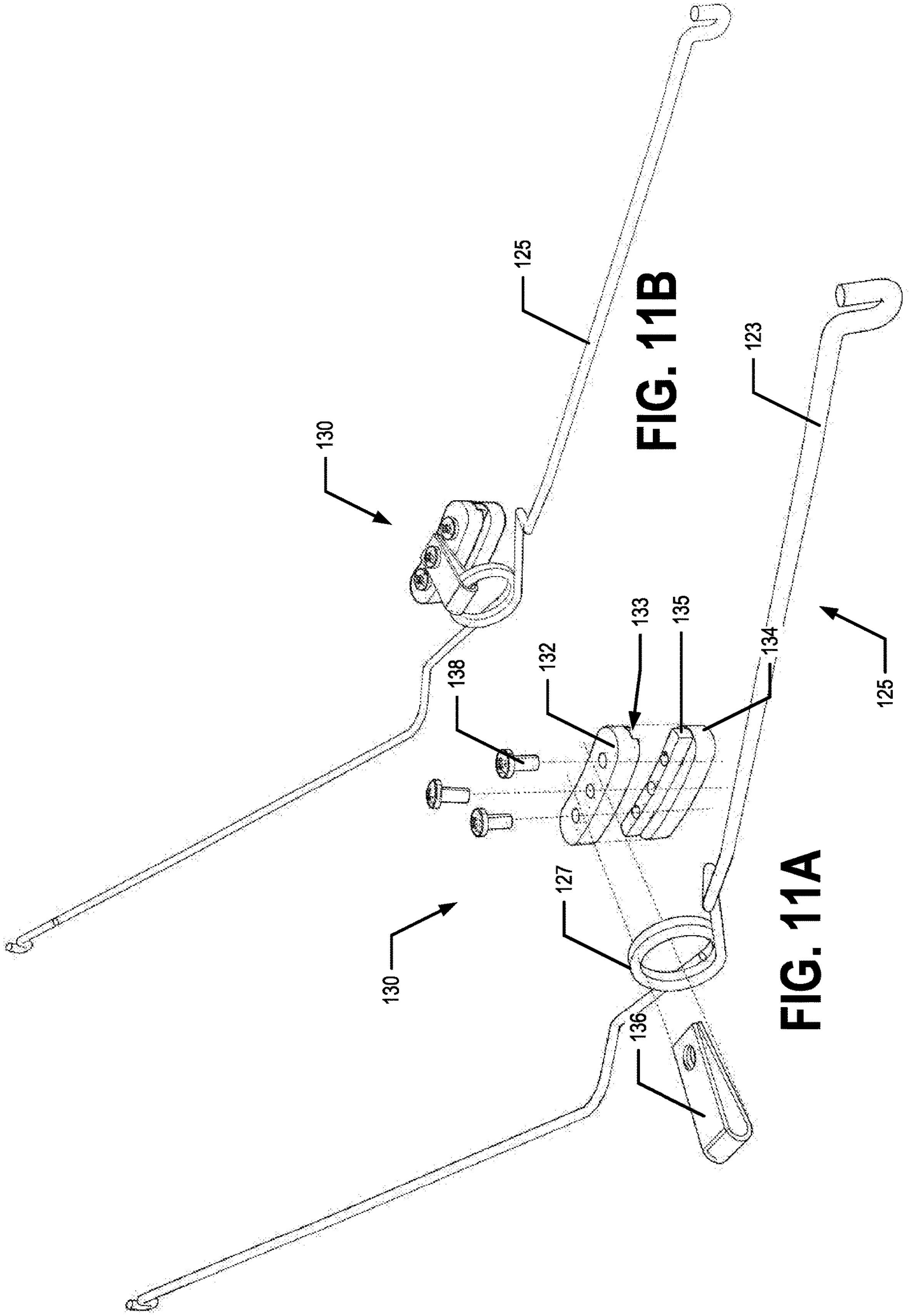
Figures 12A, 12B:
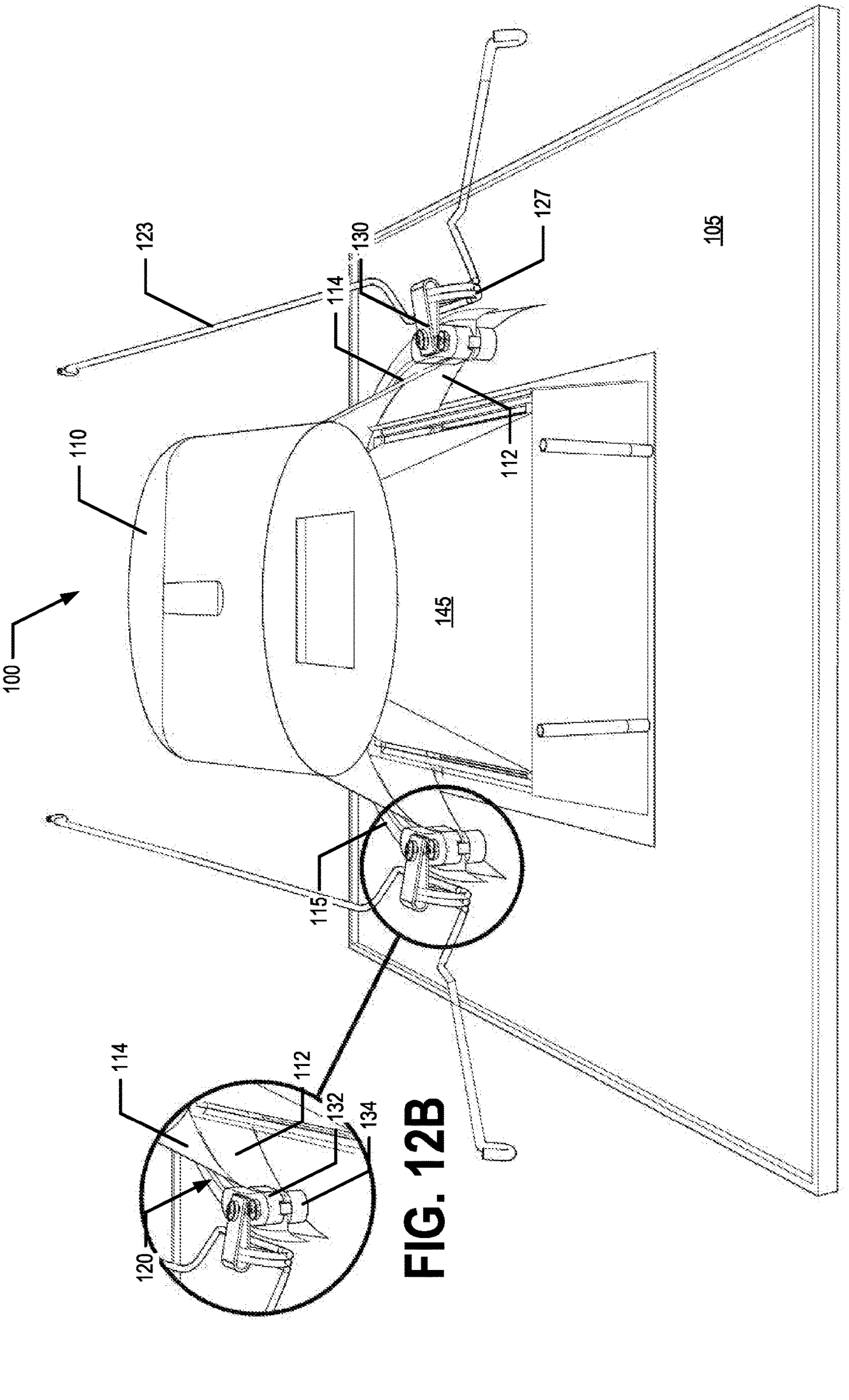
Figure 13:
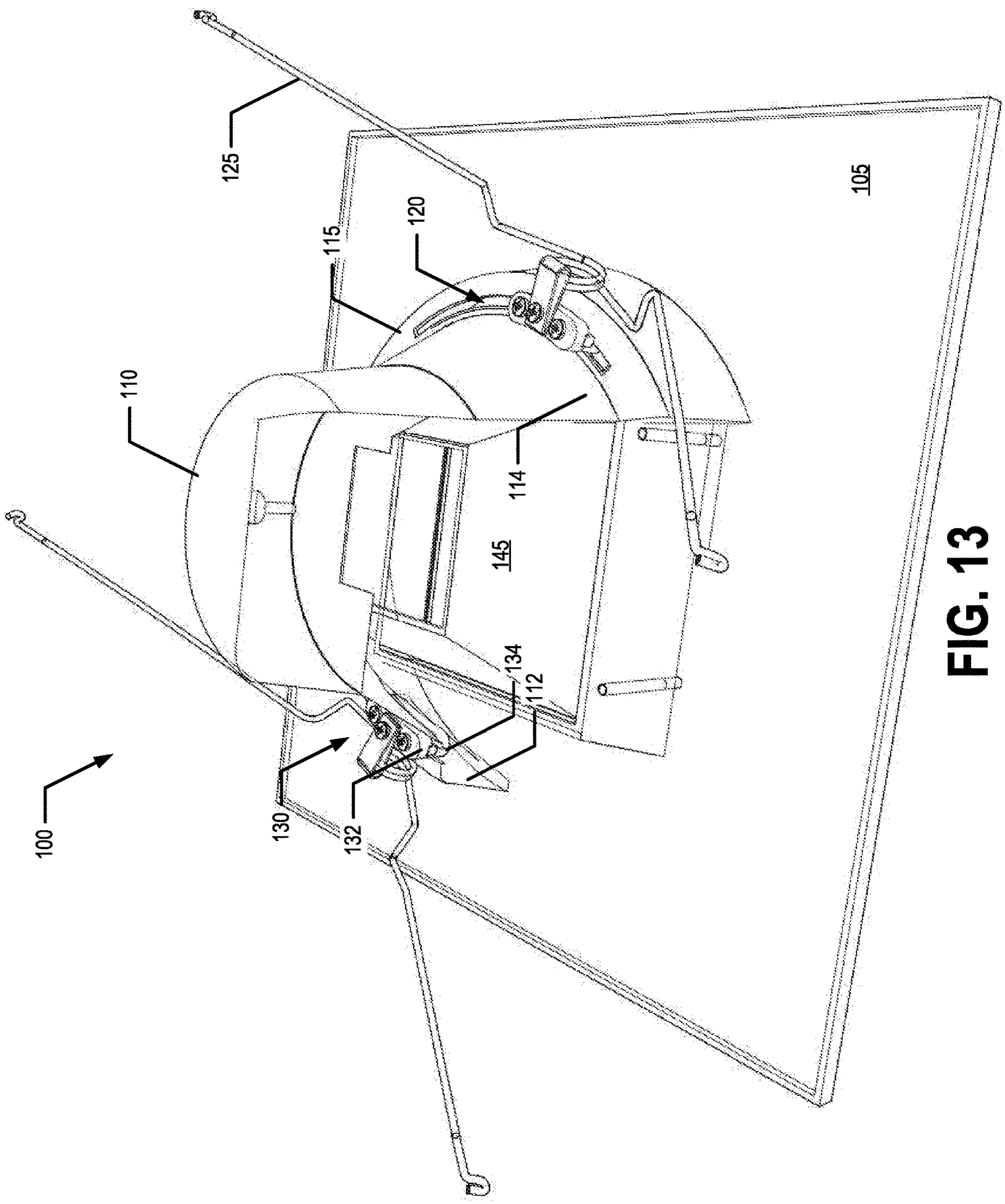
Figure 15:
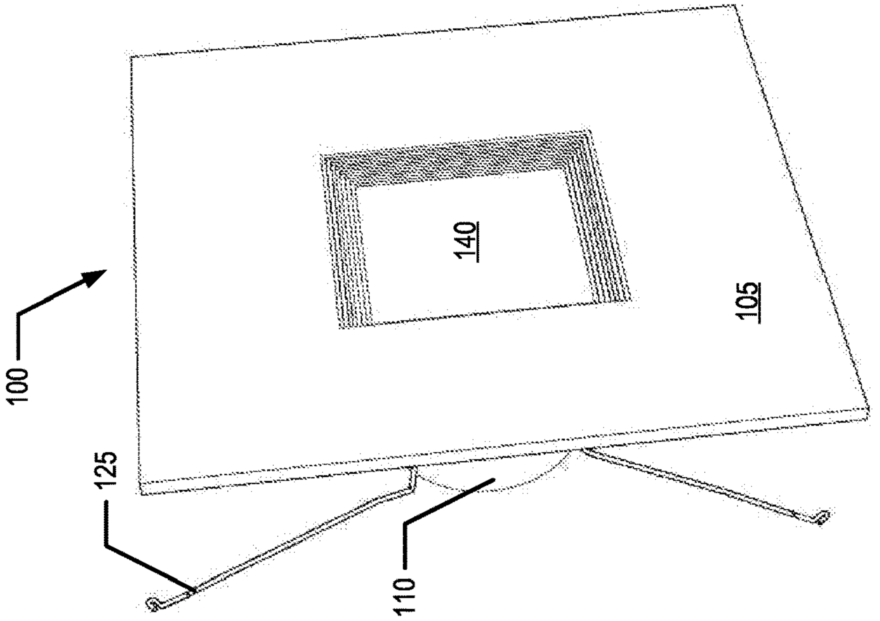
Figure 14:
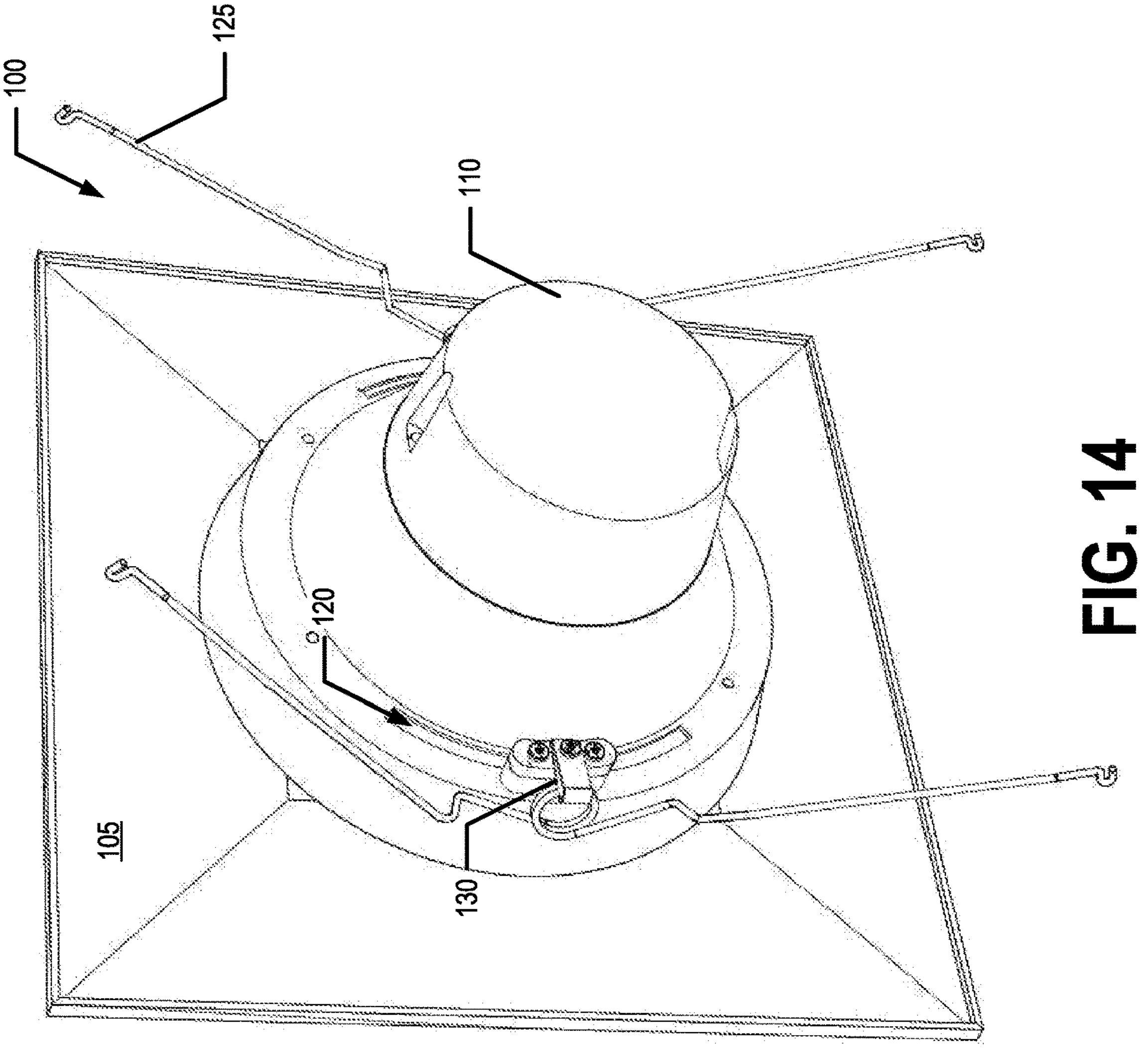
Figure 16:
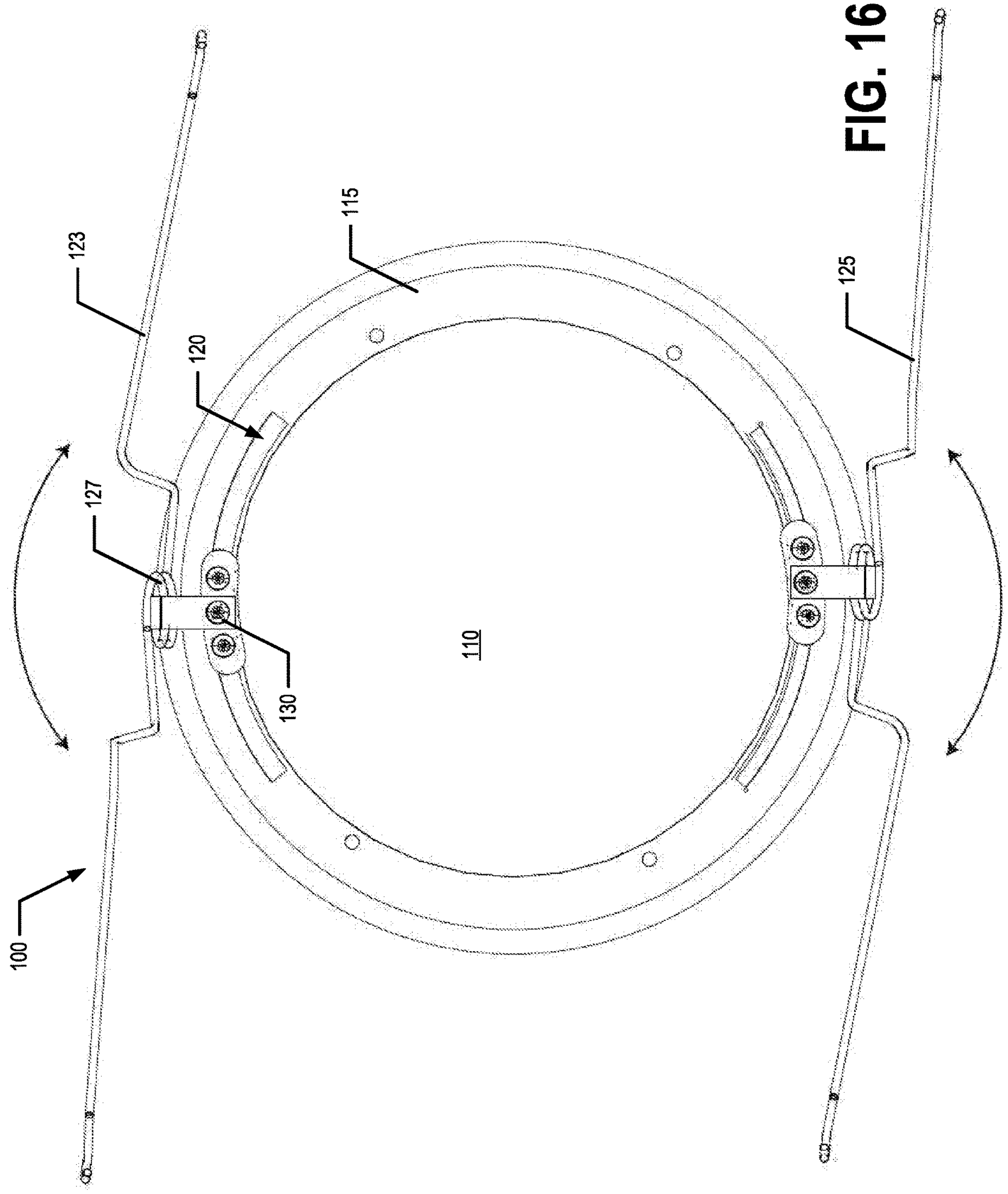
Figure 17:
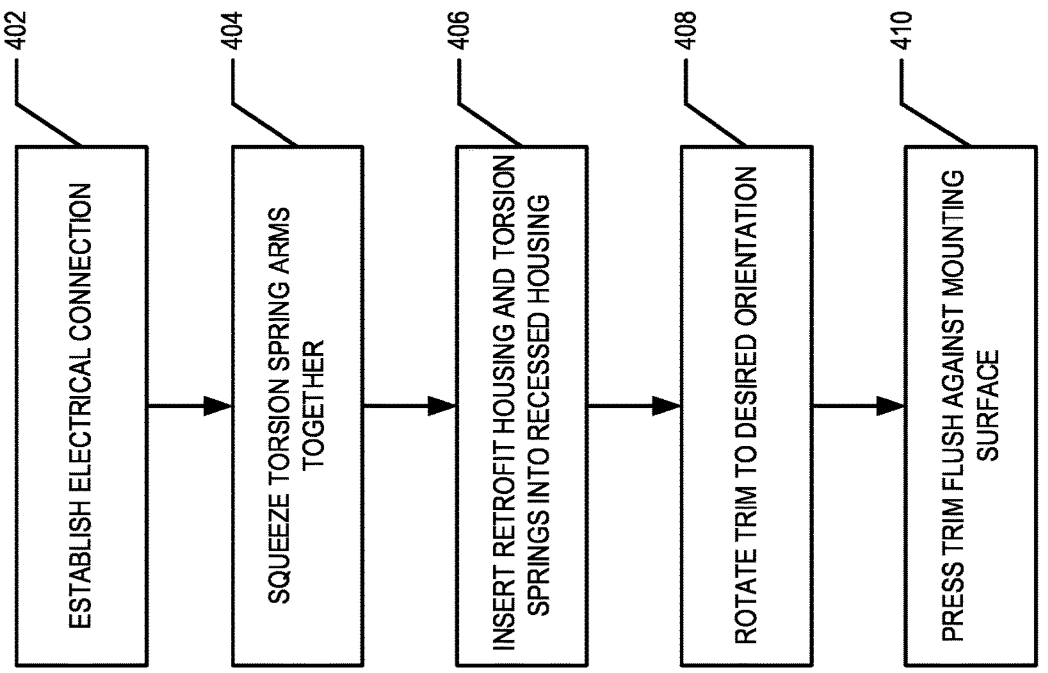

FIGS. 11A and 11B provided an exploded view and an assembled view of a slide and torsion spring, according to an example embodiment of the present invention;

FIG. 12A is a partial cross-section view of a retrofit trim lighting device, according to an example embodiment of the present invention;

FIG. 12B is a close up of a portion of the retrofit trim lighting device shown in FIG. 12A;

FIG. 13 is a partial cross-section view of a retrofit trim lighting device, according to an example embodiment of the present invention;

FIG. 14 is a perspective top view of a retrofit trim lighting device, according to an example embodiment of the present invention;

FIG. 15 is a perspective bottom view of a retrofit trim lighting device, according to an example embodiment of the present invention;

FIG. 16 is a top view of a retrofit trim lighting device, according to an example embodiment of the present invention; and FIG. 17 provides a flowchart illustrating processes and procedures for installing a retrofit trim lighting device within a recessed housing, according to example embodiments of the present invention.

DETAILED DESCRIPTION OF VARIOUS EMBODIMENTS

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

Figure 1:
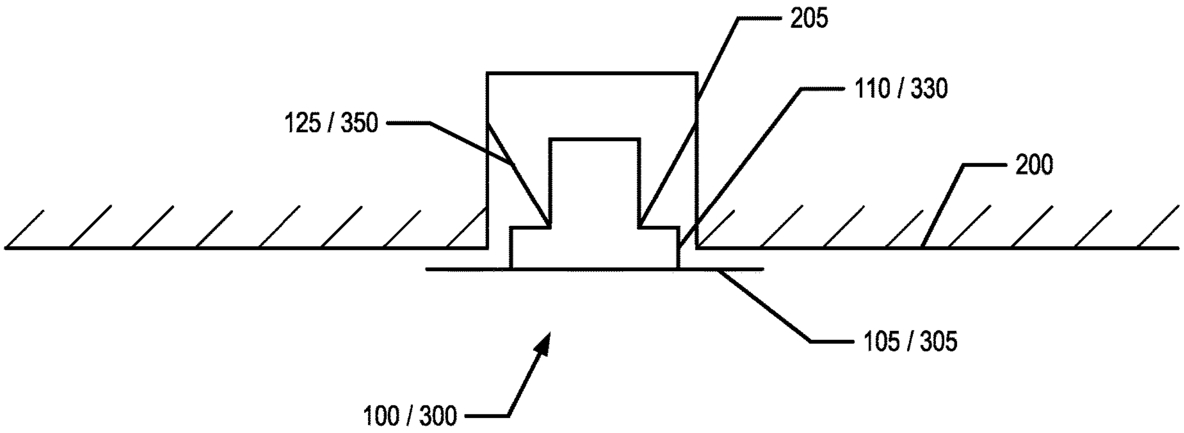
FIG. 1 is a cross-sectional view of a retrofit trim lighting device in the process of being installed within a retrofit housing, according to example embodiments of the present invention.
Figure 2:
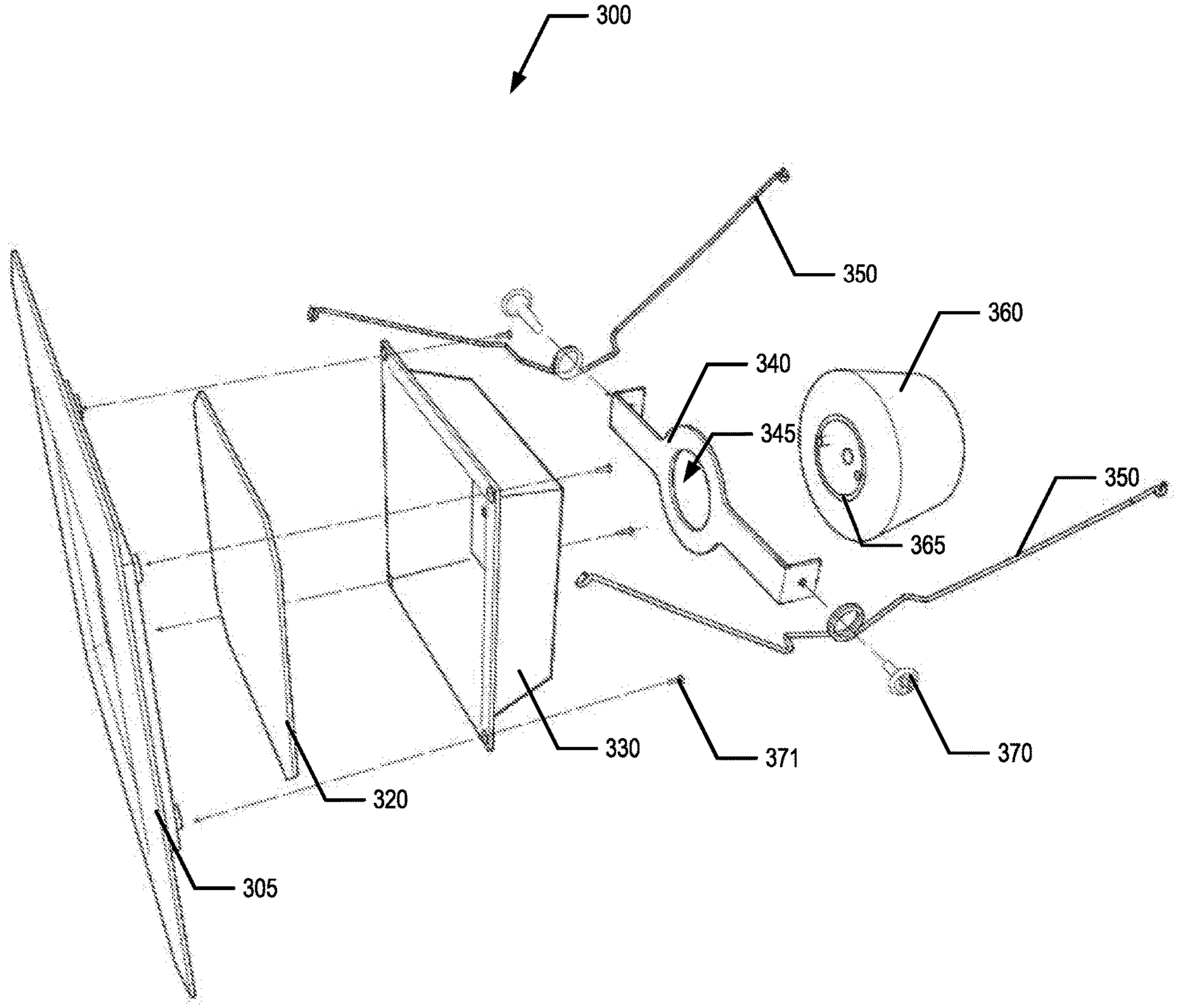
FIG. 2 is an exploded view of a retrofit trim lighting device, according to an example embodiment of the present invention.

As shown in FIG. 1, in example embodiments, a retrofit trim lighting device 300, 100 may be configured to be mounted within a recessed housing 205 that may be mounted within a mounting surface (e.g., wall, ceiling, etc.) 200. In various embodiments a recessed housing 205 may comprise means for connecting a lighting device to line voltage. For example, the recessed housing 205 may comprise electrical wires connected to line voltage, a socket configured for receiving a lamp or light bulb, and/or the like. In various embodiments, a recessed housing 205 may be configured for receiving a retrofit trim lighting device 300, 100, a lamp or light bulb and trim, and/or the like.

I. Exemplary Embodiment of a Retrofit Trim Lighting Device

FIGS. 2, 3, 4, 5, 6, and 7A illustrate various views of example embodiments of a retrofit trim lighting device 300. In various embodiments, the retrofit trim lighting device 300 may comprise a trim 305, a retrofit housing 330, a bracket 340, and an engagement element 360. In example embodiments, the retrofit trim lighting device 300 may comprise one or more torsion springs 350. For example, the one or more torsion springs 350 may be affixed and/or secured to the bracket 340. In example embodiments, the engagement element 360 may be affixed and/or secured to the retrofit housing 330 such that at least a portion of the bracket 340 is sandwiched between the retrofit housing 330 and the engagement element 360. Moreover, in example embodiments, the engagement element 360 is affixed and/or secured to the retrofit housing 330 such that the bracket 340 is secured between the engagement element 360 and the retrofit housing 330 and the retrofit housing 330 and the engagement element 360 may rotate with respect to the bracket 340. Various aspects of the retrofit trim lighting device 300 will now be described in more detail.

Exemplary Trim

In various embodiments, the trim 305 may be configured to provide the retrofit trim lighting device 300 with a particular aesthetic appearance when the lighting device is installed within the recessed housing 205. In various embodiments, the trim 305 may be shaped and/or styled to have an identifiable or discernible orientation. For example, the trim 305 may be generally square-shaped, triangularly-shaped, oval-shaped, be decorated by a design that in shape or color provides an identifiable or discernible orientation, and/or the like. The trim 305 may be secured to one end of the retrofit housing 330. For example, the trim 305 may be secured to the retrofit housing 330 (e.g., by fasteners 371) such that the orientation of the trim 305 to the retrofit housing 330 is fixed and/or not changeable.

In example embodiments, the trim 305 may comprise one or more optical components (e.g., a lens, secondary optics, and/or the like). In some example embodiments, the retrofit trim lighting device 300 may further comprise optical element 320. For example, the optical element 320 may be a lens, secondary optics, or other optical component configured to condition the light emitted by the one or more light emitting diode (LED) chips, LED packages, LED modules, and/or other light emitting element of the light engine 310. In example embodiments, the trim 305 may comprise the optical element 320. In some embodiments, the optical element 320 may be a distinct element of the retrofit trim lighting device 300.

Exemplary Retrofit Housing

In various embodiments, the retrofit housing 330 may be generally cylindrical, conical, prismatic, and/or a combination thereof. In various embodiments, with reference in particular to FIG. 3, the trim 305 may define a plane and the retrofit housing 330 may define a first axis that is generally perpendicular to the plane defined by the trim 305. For example, in some embodiments, the first axis is normal to the center point of the trim 305. In example embodiments, the recessed housing 205 may be generally cylindrical and may define a second axis along the length thereof. When the retrofit trim lighting device 300 is mounted within the recessed housing 205, the first axis may be generally parallel to the second axis.

In various embodiments, the retrofit housing 330 may be configured to house a light engine 310, secondary optics 320, a power source, and/or the like. For example, in example embodiments, the retrofit housing 330 may house a light engine 310 comprising one or more light emitting diode (LED) chips, LED packages, LED modules, and/or the like. In some embodiments, the retrofit housing 330 may house a light engine 310 comprising and/or configured for receiving and/or operating a halogen, fluorescent, compact fluorescent, incandescent, or other lamp or light bulb. In various embodiments, when the retrofit trim lighting device 300 is mounted within a recessed housing 205, the light engine 310 may be configured to emit light through the secondary optics 320 and into a room or other space at least partially defined by the mounting surface 200. In example embodiments, the secondary optics 320 may comprise a lens; decorative, translucent, and/or transparent light engine cover; light envelope; diffractive element; and/or the like. In some embodiments, the power source may comprise means for connecting the electrical components of the retrofit trim lighting device 300 (e.g., light engine, driver circuitry, and/or the like) to line voltage through the recessed housing 205. For example, the power source may comprise electrical connecting wires configured to be connected to line voltage wires of the recessed housing 205 by wire nuts, quick connect connectors, and/or the like. In another example, the power source may comprise electrical connecting wires attached to a lamp base (e.g., an A19 base) configured to be screwed, inserted, rotated, and/or the like into a traditional lamp socket of the recessed housing 205. In various embodiments, the electrical connecting wires may have one end within the interior of the retrofit housing 330 and in electrical communication with the light engine 310 (e.g., through driver circuitry and/or the like) and another end on the exterior of the retrofit housing 330 that is configured to connect to line voltage. In some example embodiments, the power source may be one or more batteries, a battery pack, and/or the like.

In example embodiments, the retrofit housing 330 is configured to be affixed and/or secured to the engagement element 360. For example, the retrofit housing 330 may comprise one or more elements configured to permit fasteners 372 to affix and/or secure the retrofit housing 330 to the engagement element 360. For example, the retrofit housing 330 may comprise one or more engagement holes 332 for affixing and/or securing the engagement element 360 to the retrofit housing 330. In example embodiments, the engagement element 360 may be affixed and/or secured to the retrofit housing 330 such that the engagement element 360 and the retrofit housing 330 cannot rotate with respect to one another. For example, the engagement element 360 may be fixedly secured to the retrofit housing 330. The bracket 340 may be sandwiched between the engagement element 360 and retrofit housing 330 such that the retrofit housing 330 and the engagement element 360 may rotate with respect to the bracket 340. However, the bracket 340 may be secured between the engagement element 360 and the retrofit housing 330 such that the bracket cannot be moved translationally with respect to the engagement element 360 and the retrofit housing 330. For example, the bracket 340 may be secured to the engagement element 360 and retrofit housing 330 while allowing for engagement element 360 and the retrofit housing 330 to rotate with respect to the bracket 340.

In example embodiments, retrofit housing 330 may comprise a planar back surface 334. For example, the planar back surface 334 may define a plane that is parallel to a bracket plane defined by a planar portion 341 of the bracket 340. In general, the planar back surface 334 may be configured to abut and/or be positioned adjacent the bracket 340 (e.g., the planar portion 341) and allow the retrofit housing 330 to rotate freely with respect to the bracket 340. For example, in example embodiments, the planar back surface 334 does not comprise any bumps or other elements the extend outward from the planar back surface 334 that would prevent the retrofit housing 330 from rotating with respect to the bracket 340 while abutting or positioned adjacent to the planar portion 341 of the bracket 340.

Exemplary Bracket

Figure 3:
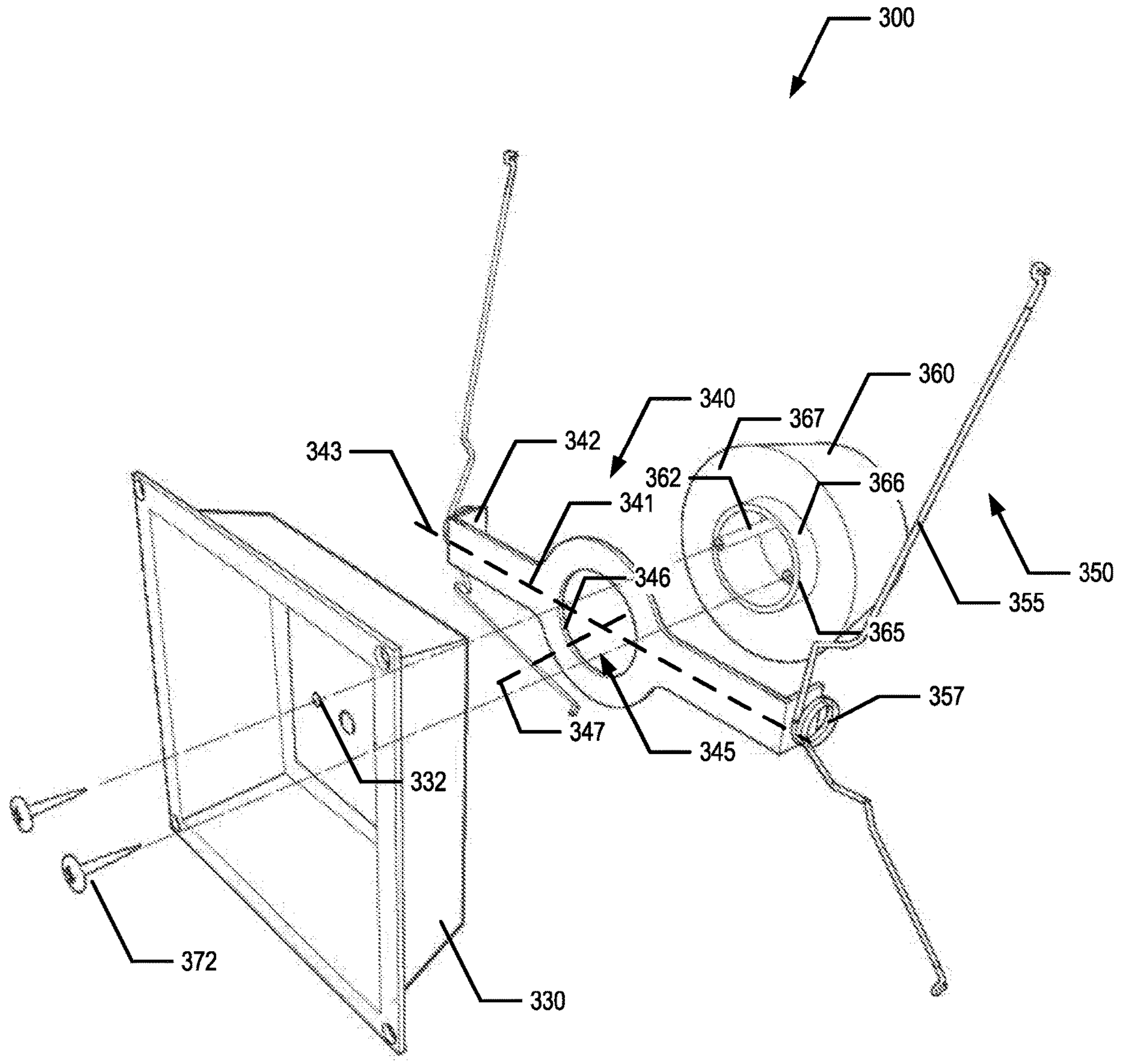
FIG. 3 is a partial exploded view of a retrofit trim lighting device, according to an example embodiment of the present invention.

As also evident in FIG. 3, the bracket 340 comprises a planar portion 341 and one or more spring attachment portions 342. For example, the bracket 340 may comprise two spring attachment portions 342, each spring attachment portion 342 configured for securing a torsion spring 350 thereto. The planar portion 341 may comprise an opening 345 configured to securing the retrofit housing 330 to the engagement element 360 therethrough. In example embodiments, the planar portion 341 may define a bracket plane. In example embodiments, when the retrofit trim lighting device 300 is mounted and/or installed within a recessed housing 205, the bracket plane is generally parallel to a plane defined by the mounting surface 200. In some embodiments, the bracket plane is generally parallel to a plane defined by the frame 305. In example embodiments, the planar portion 341 may further define a bracket axis 343 that is in and/or parallel to the bracket plane. In example embodiments, the bracket 340 is made of aluminum, some other metal, or other appropriate material.

Figure 7A:
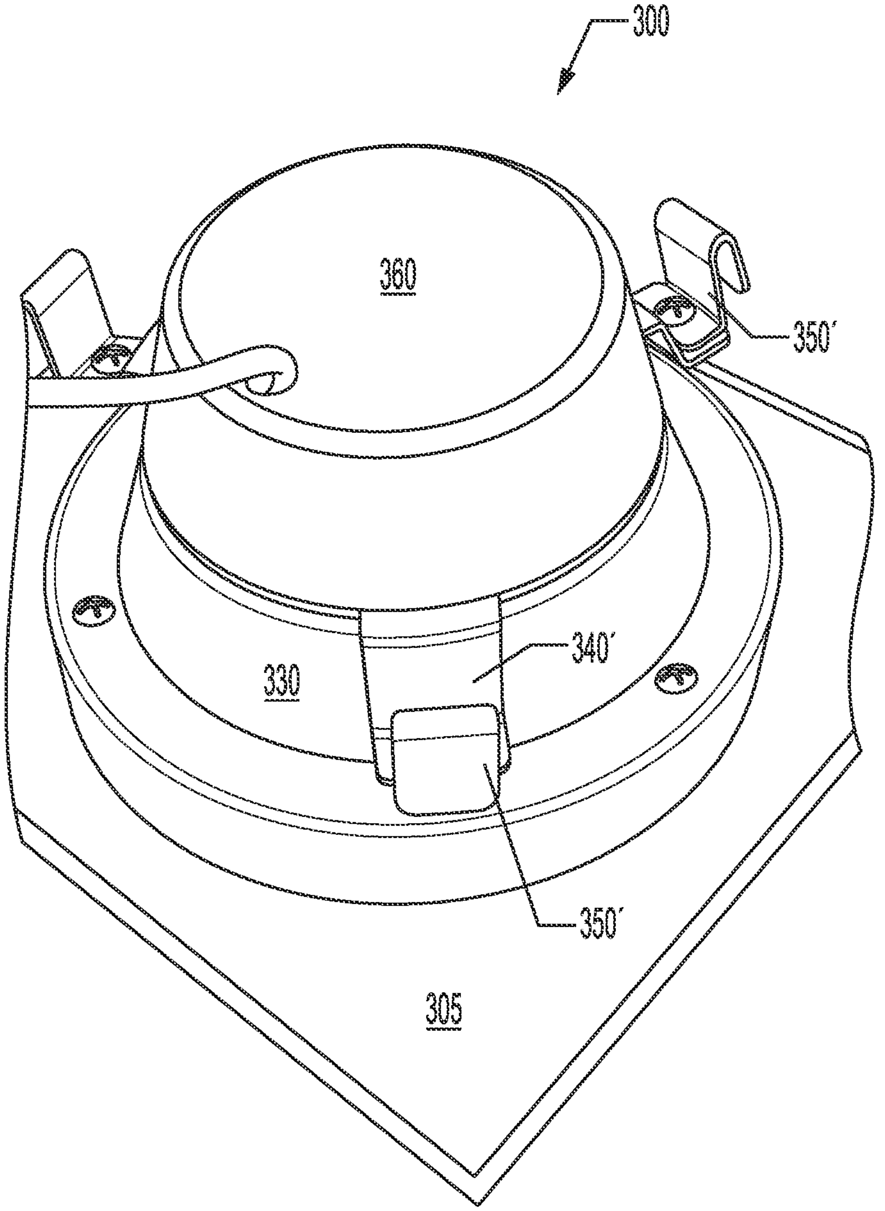
FIG. 7A is a back perspective view of another example embodiment of a retrofit trim lighting device, according to an example embodiment of the present invention.
Figure 7B:
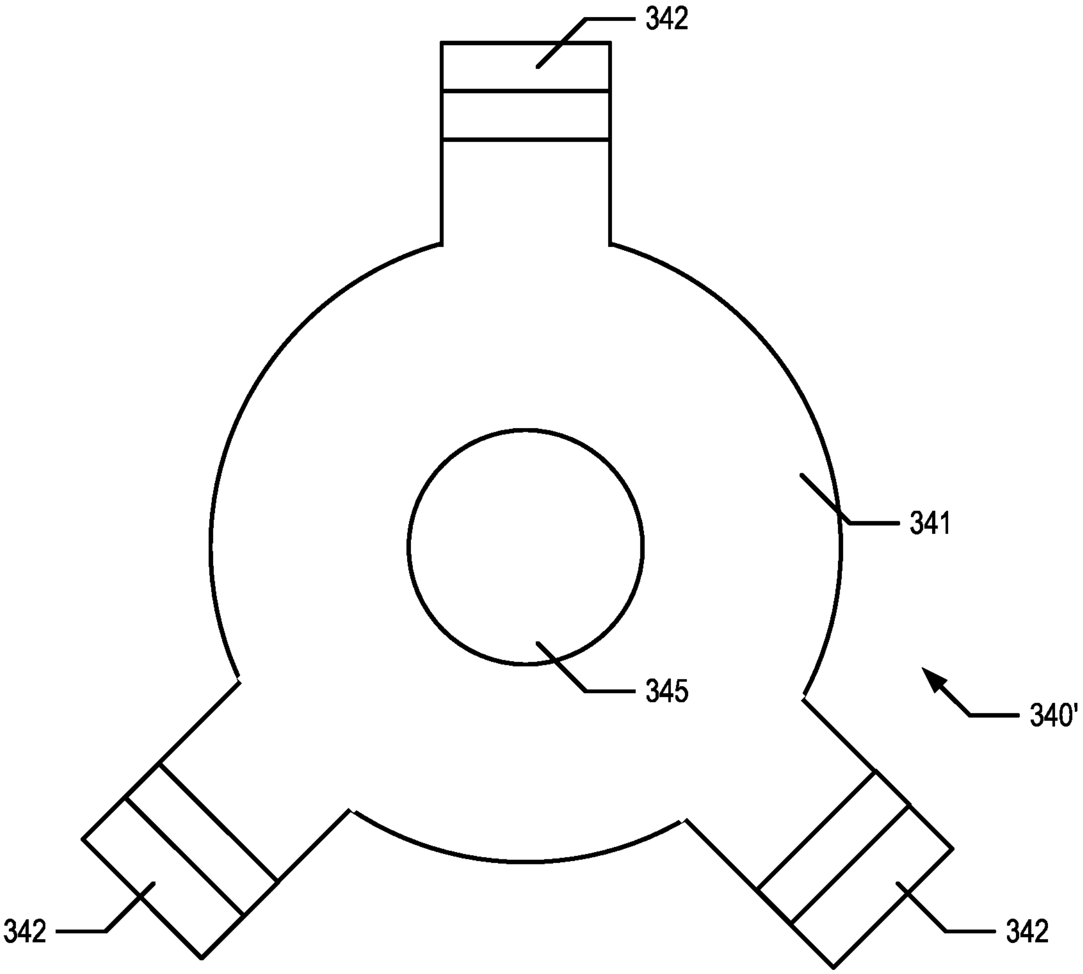
FIG. 7B is a top view of an example bracket for use with the example embodiment of the retrofit trim lighting device shown in FIG. 7A.
Figure 8B:
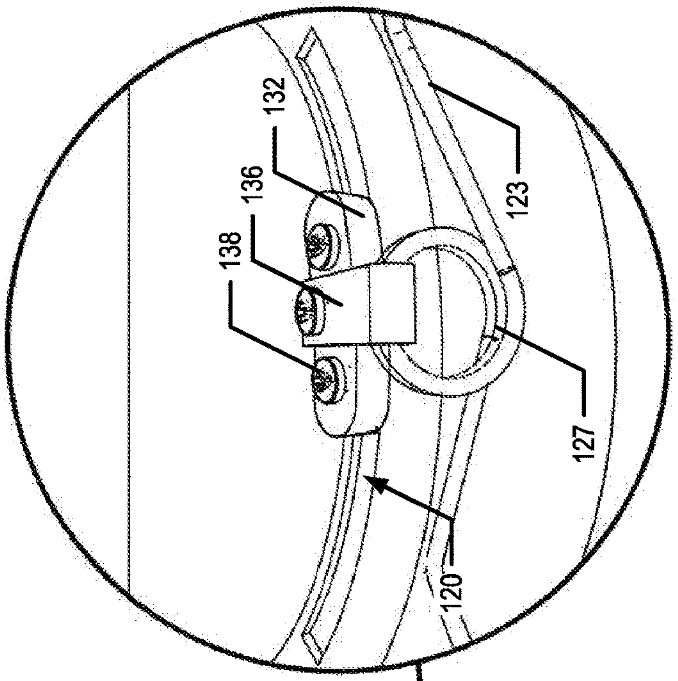
FIG. 8B is a close up view of a portion of the retrofit trim lighting device shown in FIG. 8A.
Figure 8A:
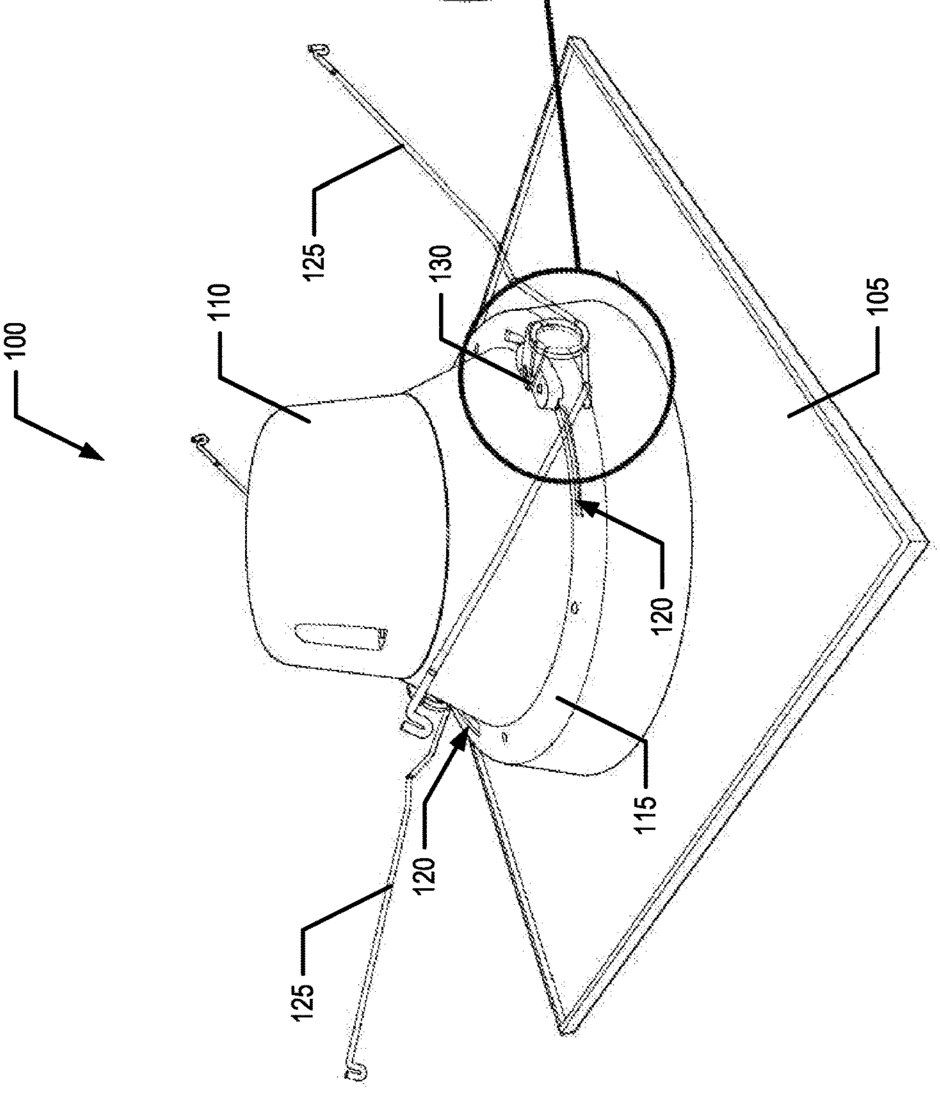
FIG. 8A is a perspective view of a retrofit trim lighting device, according to another example embodiment of the present invention.
Figure 10:
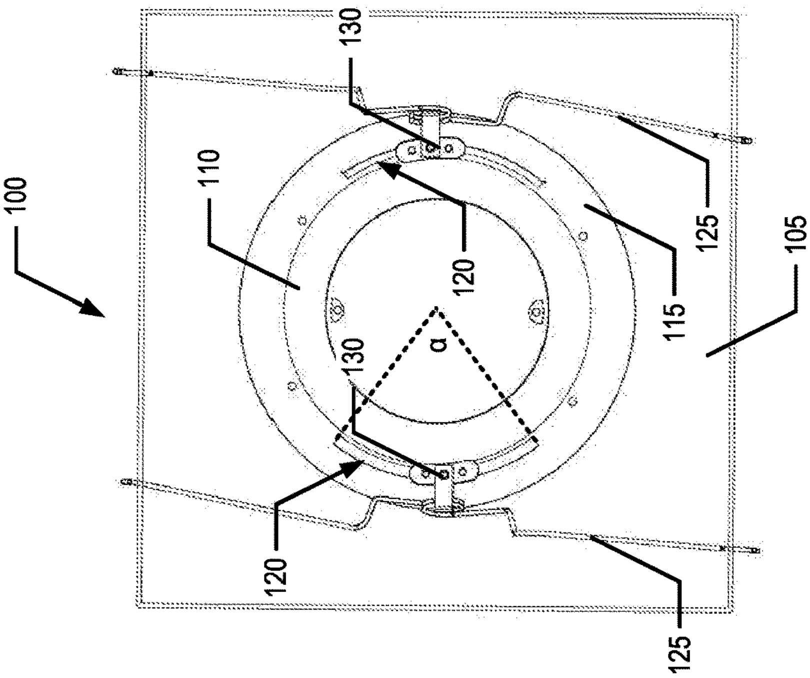
FIG. 10 is a top view of a retrofit trim lighting device, according to an example embodiment of the present invention.
Figure 9:
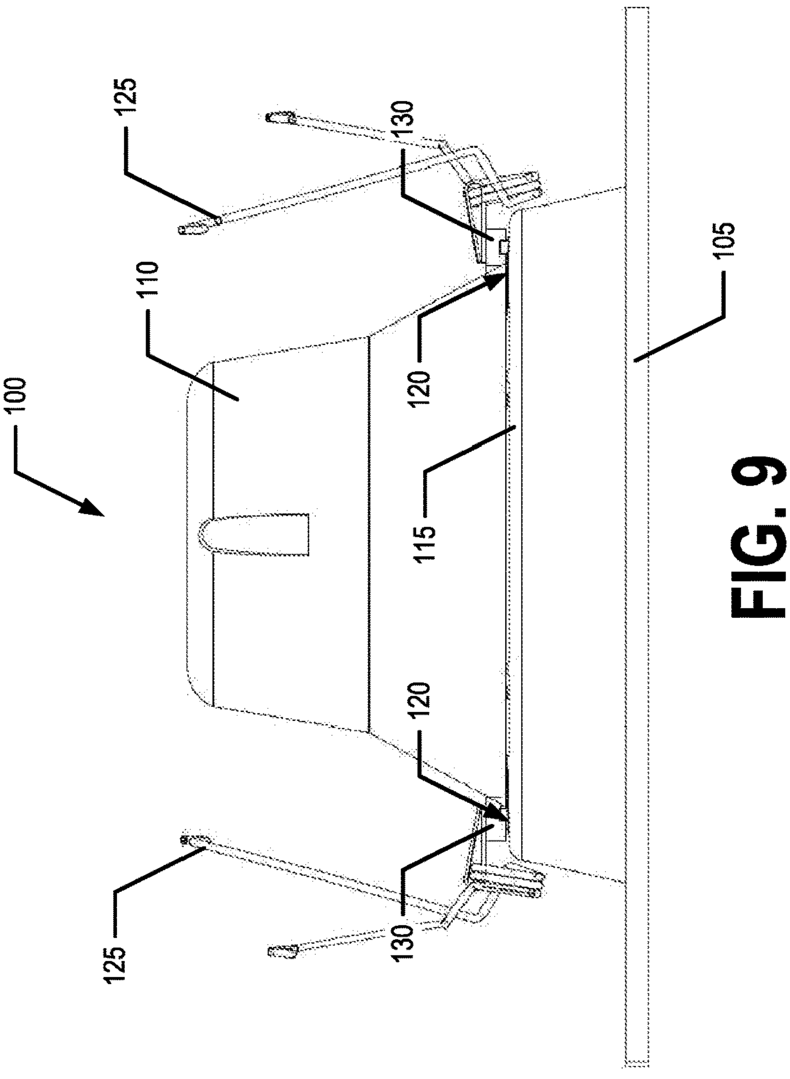
FIG. 9 is a side view of a retrofit trim lighting device, according to an example embodiment of the present invention.

In example embodiments, the bracket 340 comprises one or more spring attachment portions 342. In example embodiments, the one or more spring attachment portions 342 are generally transverse with respect to the planar portion 341. For example, in example embodiments, the one or more spring attachment portions 342 extend outwardly from the bracket plane. In example embodiments, the spring attachment portions 342 may extend generally outwardly from the bracket plane. In an example embodiment, the spring attachment portions 342 extend perpendicularly out of the bracket plane. In an example embodiment, if the bracket 340 comprises two or more spring attachment portions 342, the two or more spring attachment portions 342 extend outwardly in generally the same direction and/or in directions that are mirror reflections of each other with respect to a reflection plane that is perpendicular to the bracket plane and perpendicular to the bracket axis 343. In example embodiments, the spring attachment portions 342 may extend outwardly from the planar portion 341 in the general direction of the engagement element 360. In example embodiments, a first spring attachment portion 342 may be disposed at a first end of the planar portion 341 and a second spring attachment portion 342 may be disposed at a second end of the planar portion 341, wherein the second end of the planar portion 341 is opposite the first end of the planar portion 341. For example, a first spring attachment portion 342 may be disposed at a first end of the planar portion 341. A second spring attachment portion may be disposed at a second end of the planar portion 341, wherein the first end and the second end of the planar portion 341 are separated by a length of the planar portion 341 along the bracket axis 343. Each spring attachment portion 342 may be configured to have a torsion spring 350 affixed and/or secured thereto by a fastener 370. FIG. 7B illustrates another example embodiment of a bracket 340' having three attachment portions 342 and in which the attachment portions 342 are directed in a direction from the planar portion 341 generally toward the retrofit housing 330.

The planar portion 341 may comprise an opening 345 configured for mediating the securement of the retrofit housing 330 directly to the engagement element 360 and indirectly to the bracket 340. In particular, the fasteners 372 configured to directly and fixedly secure the retrofit housing 330 to the engagement element 360 may be at least partially passed through the opening 345. For example, the fasteners 372 may be partially disposed in the opening 345 when in a position to secure the retrofit housing 330 to the engagement element 360. For example, the engagement element 360 may comprise a pass through portion 365 configured to extend at least partially through the opening 345 and receive the fasteners 372 therein. In example embodiments, the opening 345 defines a rotation axis 347 that is perpendicular to the bracket plane. For example, the rotation axis 347 is normal to the bracket plane and intersects the bracket plane at the central point of the opening 345. When the retrofit housing 330 and the engagement element 360 rotate with respect to the bracket 340, the retrofit housing 330 and the engagement element 360 may rotate about the rotation axis 347 while the bracket 340 does not rotate. In example embodiments, the opening 345 is circular. In example embodiments, the pass through portion 365 may also be generally circular in cross-section. The diameter of the opening 345 and the diameter of the pass through portion 365 may be configured such that a peripheral surface 346 of the opening engages an outer surface 366 of the pass through portion 365 such that friction between the peripheral surface 346 and the outer surface 366 causes the retrofit housing 330 to maintain a particular orientation with respect to the bracket 340 unless acted upon by an external torque (e.g., a user and/or installer rotating the trim 305 and/or the like).

Exemplary Engagement Element

In example embodiments, the engagement element 360 may comprise a planar surface 367, a pass through portion 365, and one or more securing portions 362, as may be understood with reference to at least FIG. 3. The engagement element 360 may be configured to be affixed and/or secured to the retrofit housing 330 such that the bracket 340 is sandwiched between the retrofit housing 330 and the engagement element 360, effectively securing the bracket 340 to the retrofit housing 330 and the engagement element 360, while allowing the retrofit housing 330 and the engagement element 360 to rotate with respect to the bracket 340.

Figure 4:
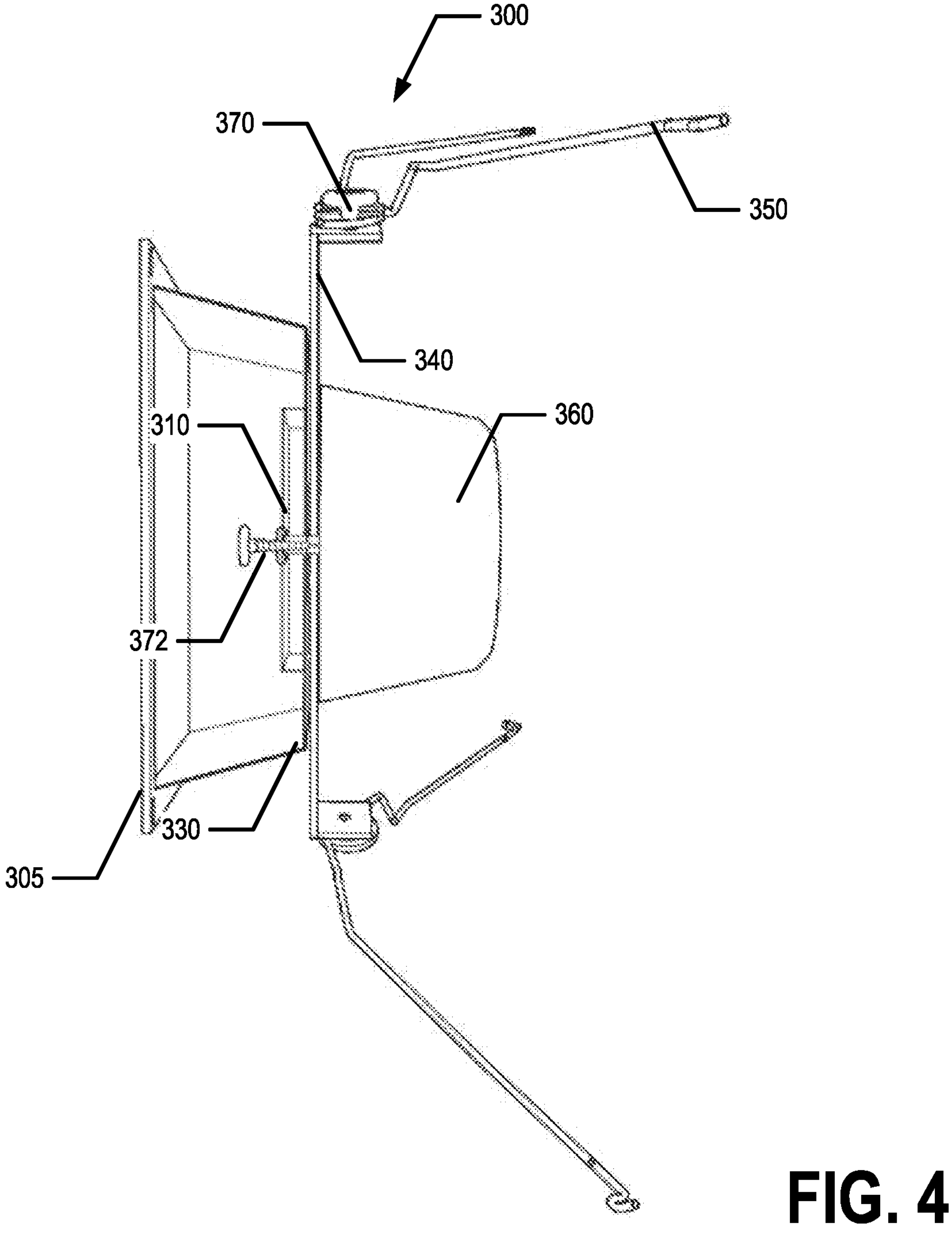
FIG. 4 is a side view of a retrofit trim lighting device, according to an example embodiment of the present invention.

In example embodiments, the planar surface 367 may define a plane that is parallel to the bracket plane, as may be understood with reference to—in combination—FIGS. 3 and 4. In general, the planar surface 367 may be configured to abut and/or be positioned adjacent the bracket 340 and allow the engagement portion 360 to rotate freely with respect to the bracket 340. For example, in example embodiments, the planar surface 367 does not comprise any bumps or other elements the extend outward from the planar surface 367 that would prevent the engagement element 360 from rotating with respect to the bracket 340 while abutting or positioned adjacent to the planar portion 341 of the bracket 340. The dimensions of the planar surface 367 may be such that, when the engagement element 360 is positioned such that the pass through portion 365 is at least partially disposed within the opening 340, the engagement element 360 does not engage and/or come into contact with the one or more spring attachment portions 342, even when the engagement element 360 is rotated with respect to the bracket 340. Moreover, the size of the engagement element 360 and/or the planar surface 367 may prevent the planar surface 367 from passing through the opening 345.

The pass through portion 365 may be configured to be positioned at least partially within the opening 345 of the bracket 340. For example, the pass through portion 365 may extend outwardly from the planar surface 367. The pass through portion 365 may have a size and shape that allows at least a portion of the pass through portion 365 to be disposed within the opening 345. For example, the opening 345 may be round and the pass through portion 365 may also be round. The diameter of the opening 345 and the diameter of the pass through portion 365 may be configured such that a peripheral surface 346 of the opening 345 and an outer surface 366 of the pass through portion 365 engage each other such that friction between the peripheral surface 346 and the outer surface 366 generally prevents the rotation of the pass through portion 365 with respect to the opening 345 unless an external torque is applied (e.g., the user and/or installer rotates the frame 305, and/or the like). For example, the engagement of the peripheral surface 346 by the outer surface 366 allows the retrofit housing to be selectively rotated with respect to the housing.

In example embodiments, the pass through portion 365 and/or a portion of the engagement element bounded by the pass through portion 365 may comprise one or more securing portions 362. For example, the securing portion 362 may be configured to receive, retain, and secure a portion of a fastener 372 therein such that the fasteners 372 fixedly secure the engagement portion 360 to the retrofit housing 330. The one or more securing portions 362 may be disposed within and/or on a portion of the engagement element 360 bounded by the pass through portion 365 such that the fasteners 372 pass through and/or are accessible through the opening 345. In particular, the securing portions 362 may receive, secure, and/or retain a portion of the fasteners 372 therein such that the fasteners pass through the opening 345 and secure the retrofit housing 330 to the engagement element 360 such that the retrofit housing 330 and the engagement element 360 sandwich the bracket 340, thereby effectively securing the bracket 340 the retrofit housing 330 and the engagement element 360. Moreover, the securing portions 362 may receive, secure, and/or retain a portion of the fasteners 372 therein such that the fasteners pass through the opening 345 and secure the retrofit housing 330 to the engagement element 360 such that the retrofit housing 330 and the engagement element 360 are rotatable about the rotation axis 347 with respect to the bracket 340. While the pass through portion 365 is described herein as a portion of the engagement element 360 that extends outwardly from the planar surface 367, in some embodiments, the pass through portion 365 may be a portion of the retrofit housing 330 and extend outwardly from the planar back portion 334.

Exemplary Torsion Springs

Figure 5:
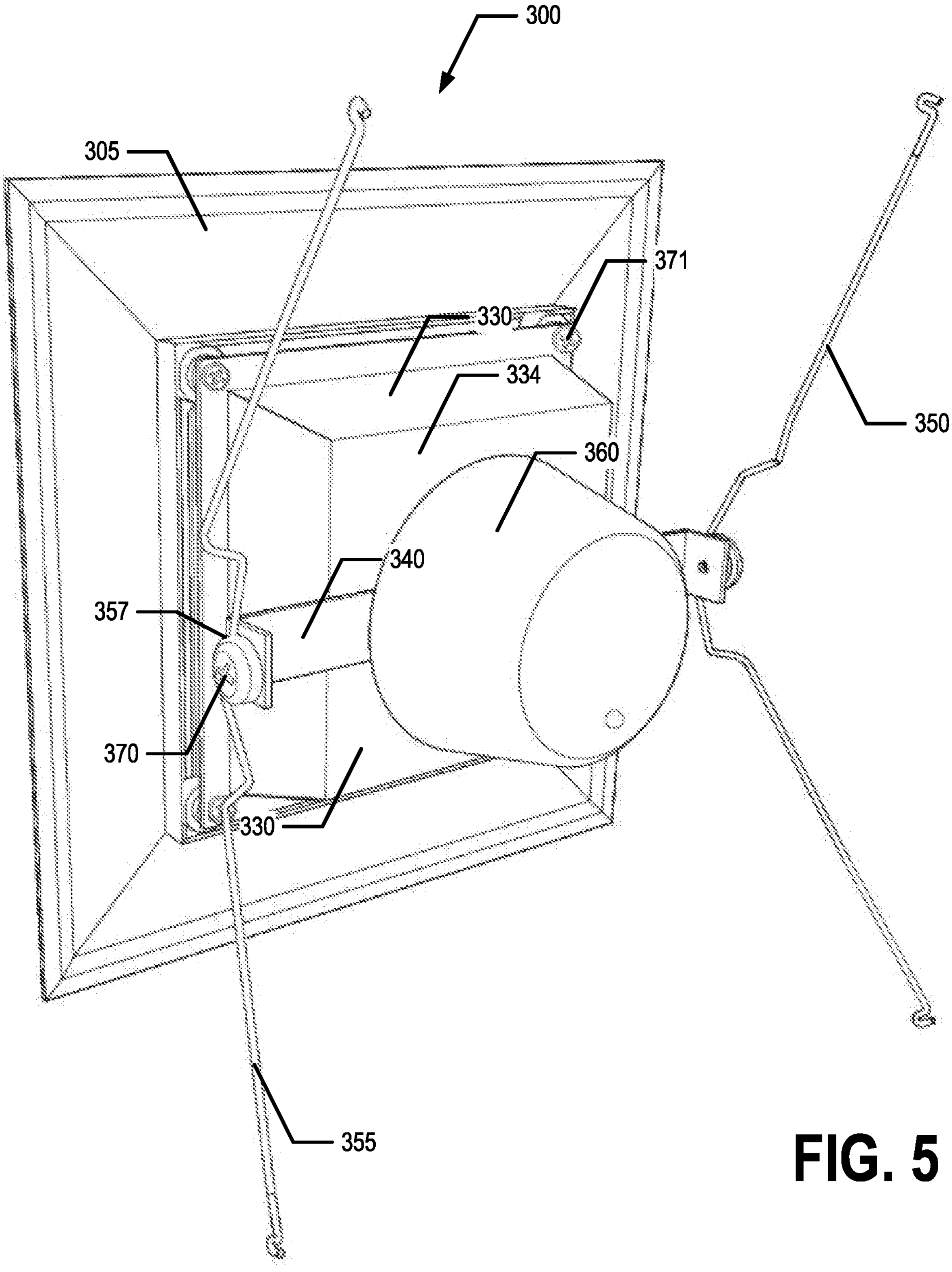
FIG. 5 is a perspective view of the back of a retrofit trim lighting device, according to an example embodiment of the present invention.
Figure 6:
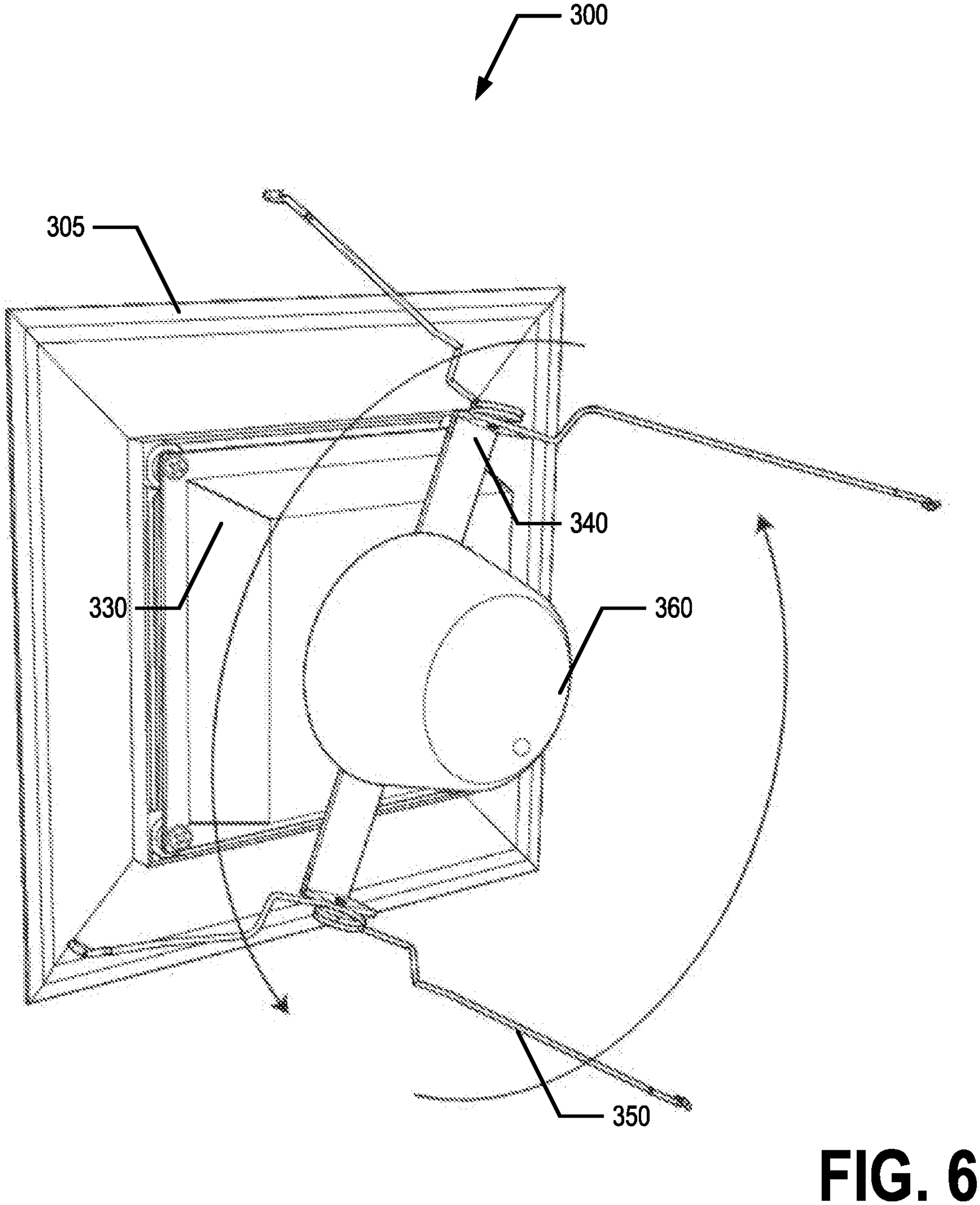
FIG. 6 is another perspective view of the back of a retrofit trim lighting device, according to an example embodiment of the present invention.

In example embodiments, the retrofit trim lighting device 300 may comprise one or more torsion springs 350 each secured to the bracket 340 by a fastener 370 (see FIGS. 3 and 5 in particular). In example embodiments, one, two, three, or four torsion springs 350 may be mounted to the bracket 340. For example, a torsion spring 350 may be secured to a spring attachment portion 342 of the bracket 340. The one or more torsion springs 350 may be configured to mechanically mount, secure, and/or hold the retrofit trim lighting device 300 within a recessed housing 205. In particular, a torsion spring 350 may be configured to mount a bracket 340 within the recessed housing 205 such that rotating the trim 305 and the retrofit housing 330 with respect to the bracket 340 causes the trim 305 and the retrofit housing 330 to be rotated with respect to the recessed housing 205. For example, the one or more torsion springs 350 may be configured to mount a bracket 340 within the recessed housing 205 such that the orientation of the trim 305 may be rotated with respect to the recessed housing 205.

In example embodiments, each torsion spring 350 comprises a spring loop 357 and two spring arms 355. In various embodiments, the spring loop 357 and spring arms 355 may act together as a helical torsion spring. In various embodiments, the spring arms 355 may be configured to engage interior walls of a recessed housing 205 to generally hold and/or retain the retrofit trim lighting device within the recessed housing 205. For example, the torsion springs 350 may be configured to hold and/or retain the retrofit housing 330 within the recessed housing 205 and to hold and/or retain a surface of the trim 305 approximately or generally flush to the mounting surface 200. In example embodiments, the torsion spring 350 may be secured to the bracket 340 by a fastener 370. For example, the fastener 370 may pass at least partially through the spring loop 357 to affix and/or secure the torsion spring 350 to the bracket 340. In other examples embodiments, the torsion springs may be other spring loaded clips 350', as shown in FIG. 7A, and/or the like as appropriate for the application.

Exemplary Fasteners

In example embodiments, the retrofit trim lighting device 300 comprises one or more fasteners (e.g., 370, 371, 372). For example, the trim 305 may be affixed and/or secured to the retrofit housing 330 by one or more fasteners 371. In another example, each torsion spring 350 may be affixed and/or secured to the bracket 340 by a fastener 370. In yet another example, the engagement element 360 may be affixed and/or secured to the retrofit housing 330 by one or more fasteners 372. In example embodiments, the one or more of the fasteners 370, 371, 372 may be screws, bolts, rivets, adhesive, and/or other mechanical fasteners appropriate for the application, and/or a combination thereof.

II. Exemplary Alternative Embodiment of a Retrofit Trim Lighting Device

FIGS. 8A, 8B, 9, 10, 11A, 11B, 12A, 12B, 13, 14, 15, and 16 illustrate various views of example embodiments of a retrofit trim lighting device 100 in accordance with the present invention. In various embodiments, the retrofit trim lighting device 100 may comprise a trim 105 and a retrofit housing 110. In example embodiments, the retrofit trim lighting device 100 may further comprise one or more torsion springs 125. Each torsion spring may be slidably secured to the retrofit housing 110 by a slide 130. Various aspects of the retrofit trim lighting device 100 will now be described in more detail.

Exemplary Trim

In various embodiments, the trim 105 may be configured to provide the retrofit trim lighting device 100 with a particular aesthetic appearance when the lighting device is installed within the recessed housing 205. In various embodiments, the trim 105 may be shaped and/or styled to have an identifiable or discernible orientation. For example, the trim 105 may be generally square-shaped, triangularly-shaped, oval-shaped, be decorated by a design that in shape or color provides an identifiable or discernible orientation, and/or the like. The trim 105 may be secured to one end of the retrofit housing 110. For example, the trim 105 may be secured to the retrofit housing 110 such that the orientation of the trim 105 to the retrofit housing 110 is fixed and/or not changeable.

Exemplary Retrofit Housing

In various embodiments, the retrofit housing 110 may be generally cylindrical, conical, and/or a combination thereof. In various embodiments, the trim 105 may define a plane and the retrofit housing 110 may define a first axis that is generally perpendicular to the plane defined by the trim 105. For example, in some embodiments, the first axis is normal to the center point of the trim 105. In example embodiments, the recessed housing 205 may be generally cylindrical and may define a second axis along the length thereof. When the retrofit trim lighting device 100 is mounted within the recessed housing 205, the first axis may be generally parallel to the second axis.

In various embodiments, the retrofit housing 110 may be configured to house a light engine 145, secondary optics 140, a power source, and/or the like. For example, in example embodiments, the retrofit housing 110 may house a light engine 145 comprising one or more light emitting diode (LED) chips, LED packages, LED modules, and/or the like. In some embodiments, the retrofit housing 110 may house a light engine 145 comprising and/or configured for receiving and/or operating a halogen, fluorescent, compact fluorescent, incandescent, or other lamp or light bulb. In various embodiments, when the retrofit trim lighting device 100 is mounted within a recessed housing 205, the light engine 145 may be configured to emit light through the secondary optics 140 and into a room or other space at least partially defined by the mounting surface 200. In example embodiments, the secondary optics 140 may comprise a lens; decorative, translucent, and/or transparent light engine cover; light envelope; diffractive element; and/or the like. In some embodiments, the power source may comprise means for connecting to line voltage through the recessed housing 205. For example, the power source may comprise electrical connecting wires configured to be connected to line voltage wires of the recessed housing 205 by wire nuts, quick connect connectors, and/or the like. In another example, the power source may comprise electrical connecting wires attached to a lamp base (e.g., an A19 base) configured to be screwed, inserted, and/or the like into a traditional lamp socket of the recessed housing 205. In various embodiments, the electrical connecting wires may have one end within the interior of the retrofit housing 110 and in electrical communication with the light engine 145 and another end on the exterior of the retrofit housing 110 that is configured to connect to line voltage. In some example embodiments, the power source may be one or more batteries, a battery pack, and/or the like.

In various embodiments, the retrofit housing 110 may comprise one or more slots 120. Each slot 120 may provide an opening through the retrofit housing 110 from an interior surface 112 to an exterior surface 114 of the retrofit housing 110. In various embodiments, the slots 120 may define an arc about a portion of the circumference of the retrofit housing 110. In example embodiments, the slots 120 are defined by a constant radius from the first axis. In example embodiments, the retrofit housing 110 may comprise two slots 120, each slot having a length defined by an arc angle α of approximately 90°. In example embodiments, each slot may have a length defined by an arc angle of 45°<α<90°; however in some embodiments the arc angle α may be less than 45° or more than 90°. In example embodiments, the sum of the arc angles of all of the slots is less than 360°.

In various embodiments, the retrofit housing 110 may comprise a first portion having a first diameter and located adjacent the trim 105. The retrofit housing 110 may further comprise a second portion having a second diameter and located at an end of the retrofit housing 110 that is opposite the trim 105. In such embodiments, the second diameter is less than the first diameter and there is a transition or hip portion 115 between the first portion and the second portion. In some embodiments, the one or more slots 120 are disposed in the transition or hip portion 115 of the retrofit housing 110. For example, in some embodiments, the diameter of the retrofit housing 110 may change much more significantly or quickly per along the length of the retrofit housing 110 (e.g., along the length of the first axis) in the transition and/or hip portion 115 than in the first or second portion adjacent the ends of the retrofit housing 110. In some embodiments, the one or more slots 120 are disposed in the transition or hip portion 115 of the retrofit housing 110.

In various embodiments, the one or more slots 120 are configured for securing therethrough one or more slides 130 to the retrofit housing 110. For example, each slot 120 may have a slide 130 secured therethrough such that the slide 130 is slidably secured to the retrofit housing 110. For example, the slide 130 may be configured to slide along the length, or at least a portion of the length, of the corresponding slot 120. In various embodiments, a slide 130 may be configured to secure a torsion spring 125 to the retrofit housing 110.

Exemplary Torsion Springs

In example embodiments, the retrofit trim lighting device 100 may comprise one or more torsion springs 125 slidably secured to the retrofit housing 110 by one or more slides 130. The one or more torsion springs 125 may be configured to mechanically mount, secure, and/or hold the retrofit trim lighting device 100 within a recessed lighting device receptacle (referred to as recessed housing 205 herein). In particular, a slide 130 may be configured to secure a torsion spring 125 to the retrofit housing 110 such that the position of the torsion spring about the retrofit housing 110 may be modified by sliding the slide 130 along the slot 120. For example, if the slots 120 are arcs, the retrofit housing 110 (and trim 105) may be rotated with respect to the torsion springs 125 by sliding the slides 130 along the slots 120. An example embodiment comprises two slots 120, two slides 130, and two torsion springs 125, wherein each torsion spring 125 corresponds to one slide 130 and one slot 120.

In example embodiments, each torsion spring 125 comprises a spring loop 127 and two spring arms 123. In various embodiments, the spring loop 127 and spring arms 123 may act together as a helical torsion spring. In various embodiments, the spring arms 123 may be configured to engage interior walls of a recessed housing 205 to generally hold and/or retain the retrofit trim lighting device within the recessed housing 205. For example, the torsion springs 125 may be configured to hold and/or retain the retrofit housing 110 within the recessed housing 205 and to hold and/or retain a surface of the trim 105 approximately or generally flush to the mounting surface 200. In example embodiments, the torsion spring 125 may be secured to the clip 130 by a slide clip 136. For example, the slide clip 136 may engage the spring loop 127 to secure the torsion spring 125 to the slide 130.

Exemplary Slide

In example embodiments, the slide 130 comprises a slide clip 136, an exterior portion 132, and an interior portion 134. In various embodiments, the slide clip 136, exterior portion 132, and the interior portion 134 may be secured together by one or more fasteners 138, adhesive, and/or the like. In various embodiments, the interior portion 134 may be positioned adjacent an interior surface 112 of the retrofit housing 110 and the exterior portion 132 may be positioned adjacent an exterior surface 114 of the retrofit housing 110. The exterior portion 132 and the interior portion 134 of the slide 130 may be secured to each other through the slot 120. In example embodiments, the exterior portion 132 is configured such that the exterior portion 132 generally cannot pass through the slot 120. In example embodiments, the interior portion 134 is configured such that generally the interior portion 134 cannot as a whole pass through the slot 120.

In example embodiments, the interior portion, in example embodiments, comprises a spine 135 configured to at least partially pass through the slot 120. For example, when the slide 130 is secured to the retrofit housing 110, a portion of the spine 135 may be within the interior of the retrofit housing 110, a portion of the spine 135 may be within the slot 120, and a portion of the spine 135 may be exterior to the retrofit housing 110. In example embodiments, the exterior portion 132 is secured to the interior portion 134 through the spine 135. In example embodiments, the spine 135 may have a generally rectangular cross-section, though other cross-sections are possible. In example embodiments, the spine 135 may have a width configured to allow the slide to easily slide along the length of the slot 120 when an installer is setting the orientation of the trim 105, but to generally not slide along the slot 120 without the application of an intentional torque thereto.

In example embodiments, the exterior portion 132 comprises a channel 133 configured to receive the spine 135 therein. In various embodiments, a cross-section of the channel 133 may approximately match the corresponding cross-section of the spine 135. It should be understood that the exterior portion 132 may comprise a spine 135 and/or the interior portion 134 may comprise a channel 133, in various embodiments.

In example embodiments, when the retrofit trim lighting device 100 is mounted within the recessed housing 205, the pressure of the torsion spring arms 123 on the walls of the recessed housing 205 may prevent the torsion springs 125 from rotating easily within the recessed housing 205. However, the slides 130 are generally configured to slide within the slots 120. As the slides 130 are fixedly secured to the torsion springs 125 (e.g., via spring clip 136), the retrofit housing 110 and the trim 105 secured thereto may be rotated with respect to the torsion springs 125 and the recessed housing 205. For example, the retrofit housing 110 and trim 105 may be rotated with respect to the torsion springs 125 and the recessed housing 205 to place the trim 105 in a particular orientation and/or a particular orientation with respect to the trim(s) 105 of one or more other recessed lighting devices or retrofit trim lighting devices 100.

III. Exemplary Method of Installing a Retrofit Trim Lighting Device

FIG. 17 provides a flowchart of various procedures that may be completed to install a retrofit trim lighting device 300, 100 within a recessed housing 205. Starting at step 402, an electrical connection between the retrofit trim lighting device 300, 100 and line voltage is established. For example, a connection between electrical connecting wires of the retrofit trim lighting device 300, 100 and the line voltage wires may be established. In another example, a base similar to a traditional lamp or light bulb base (e.g., an A19 base or the like) connected to electrical connecting wires of the retrofit trim lighting device 300, 100 may be screwed, inserted, rotated, and/or the like into a socket of the recessed housing 205 to establish a connection between the electrical components of the retrofit trim lighting device 300, 100 and line voltage (or an appropriate voltage source for operating the retrofit trim lighting device 300, 100). In some embodiments, the retrofit trim lighting device 300, 100 may be battery operated, for example, and no connection with line voltage may be established.

At step 404, the spring arms 355, 123 of the torsion springs 350, 125 may be squeezed together. At step 406, the torsion springs 350, 125 may be at least partially positioned within the recessed housing 205 and released. The spring arms 355, 123 of the torsion springs 350, 125 may engage the sidewalls of the recessed housing 205 to maintain the retrofit trim lighting device 300, 100 generally within the recessed housing 205.

At step 408, the trim 305, 105 and the retrofit housing 330, 110 may be rotated with respect to the recessed housing 205 to position the trim 305, 105 in a preferred or desired orientation. For example, the trim 305 and the retrofit housing 330 may be rotated with respect to the bracket 340 to position the trim 305 in a preferred or desired orientation. In another example, the trim 105 and the retrofit housing 110 may be rotated with respect to the torsion springs 125 to position the trim 105 in a preferred or desired orientation. For example, an installer may hold the trim 305, 105 and rotate the trim 305, 105 with respect to the recessed housing 205 (and the bracket 340 and/or the torsion springs 350, 125) to position the trim 305, 105 in a preferred and/or desired orientation. At step 410, the retrofit trim lighting device 300, 100 is pushed into the recessed housing 205 until a surface of the trim 305, 105 adjacent the retrofit housing 330, 110 is approximately and/or generally flush against the mounting surface 200. In some embodiments, step 410 may be completed before step 408.

IV. Conclusion

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A bracket assembly comprising:

an engagement element configured to be secured to a retrofit housing; and a bracket comprising a portion having a circular segment and first and second linear segments, the circular segment having an exterior perimeter and an interior perimeter that are coplanar relative to one another, the interior perimeter being defined by an opening extending through the portion, wherein:

the first and second linear segments each intersect and have a length extending outwardly from the exterior perimeter of the circular segment, and the engagement element is configured to secured to the retrofit housing through the opening, such that the retrofit housing and the bracket are rotatable relative to one another.

2. The bracket assembly of claim 1, wherein:

distal ends of the first and second linear segments define opposing ends of the portion; and the bracket assembly further comprises:

an attachment portion positioned at the one of the opposing ends of the portion, the attachment portion extending normal to the portion; and at least one torsion spring secured to the attachment portion.

3. The bracket assembly of claim 2, wherein:

the at least one torsion spring comprises two torsion springs;

the bracket assembly further comprises two attachment portions each positioned at respective ones of the opposing ends of the portion, the two attachment portions extending normal to the portion; and a respective one of the two torsion springs is secured to a respective one of the two attachment portions.

4. The bracket assembly of claim 1, wherein the portion of the bracket defines a bracket plane.

5. The bracket assembly of claim 1, wherein:

at least one of the engagement element and the retrofit housing comprises a pass through element, and the pass through portion is configured to be partially disposed within the opening.

6. The bracket assembly of claim 1, wherein:

the retrofit housing comprises at least one light engine; and the bracket assembly further comprises one or more optical elements configured to condition light emitted by the at least one light engine.

7. The bracket assembly of claim 4, wherein:

a rotation axis passes through the center of the opening and is normal to the bracket plane, and the retrofit housing is rotatable with respect to the bracket about the rotation axis.

8. The bracket assembly of claim 1, wherein:

a rotation axis passes through the center of the opening, and the retrofit housing is rotatable with respect to the bracket about the rotation axis.

9. The bracket assembly of claim 5, wherein an outer surface of the pass-through element engages with a peripheral surface of the opening.

10. The bracket assembly of claim 9, wherein the engagement of the peripheral surface by the outer surface allows the retrofit housing to be selectively rotated with respect to the housing.

11. The bracket assembly of claim 1, further comprising a frame secured to the retrofit housing on an opposite side of the retrofit housing from the engagement element, the frame being configured to provide an aesthetic appearance.

12. The bracket of claim 1, wherein the retrofit housing is affixed to the engagement element through the opening by one or more fasteners.

13. A bracket comprising:

a portion having a circular segment and first and second linear segments, the circular segment having an exterior perimeter and an interior perimeter that are coplanar relative to one another, the interior perimeter being defined by an opening extending through the portion, the first and second linear segments each intersecting and having a length extending outwardly from the exterior perimeter; and an engagement element configured to be secured to a retrofit housing through the opening such that the retrofit housing and the bracket are rotatable relative to one another.

14. The bracket of claim 13, wherein:

distal ends of the first and second linear segments define opposing ends of the portion;

the bracket further comprises two attachment portions each positioned at respective ones of the opposing ends of the portion, the two attachment portions extending normal to the portion; and the bracket further comprises a pair of torsion springs secured adjacent respective ones of the two attachment portions.

15. The bracket of claim 13, wherein:

distal ends of the first and second linear segments define opposing ends of the portion; and the bracket further comprises a pair of torsion springs each secured adjacent respective ones of the opposing ends of the portion of the bracket.

16. The bracket of claim 13, wherein the retrofit housing comprises at least one light engine having at least one LED package.

17. The bracket of claim 13, further comprising a frame secured to the retrofit housing on an opposite side of the retrofit housing from the engagement element, the frame being configured to provide an aesthetic appearance.

18. The bracket of claim 13, wherein:

a rotation axis passes through the center of the opening, and the retrofit housing is rotatable with respect to the bracket about the rotation axis.

19. A bracket comprising:

a portion having a circular segment and at least one linear segment, the circular segment having an exterior perimeter and an interior perimeter that are coplanar relative to one another, the interior perimeter being defined by a through hole, the at least one linear segment intersecting and having a length extending outwardly from the exterior perimeter; and an engagement element configured to be secured to a retrofit housing through the through hole such that the retrofit housing and the bracket are rotatable relative to one another.

* * * * *